Oct. 26, 1965      J. V. SELZER      3,214,196

PIPE-TO-PLATE JOINT WITH CAM LOCKING MEANS

Filed Nov. 23, 1962

INVENTOR.
JOHN V. SELZER

BY Robertson and Smythe

ATTORNEYS

United States Patent Office

3,214,196
Patented Oct. 26, 1965

3,214,196
PIPE-TO-PLATE JOINT WITH CAM LOCKING MEANS
John V. Selzer, Brooklyn, N.Y., assignor to The Marbelite Company, Inc., Brooklyn, N.Y., a corporation of New York
Filed Nov. 23, 1962, Ser. No. 239,757
3 Claims. (Cl. 285—39)

This invention relates to locking devices and particularly to an improved cam locking device capable of securely but releasably locking one member to another.

Although the principles of the invention are applicable to a locking device for releasably locking any two members together, they are shown and will be described as applied to the releasable locking of a traffic signal housing to a bracket or conduit.

The attachment of traffic signal housings to brackets or conduits heretofore required the insertion of a threaded nipple through an opening in the housing, tightening it in a fitting, forming part of the bracket, and threading a nut onto the nipple on the inside of the signal housing. This required tightening the nut within the housing and since space limitations and wiring usually prevented the use of a wrench, tightening of the nut presented a problem that was usually solved by employing a hammer and chisel on the periphery of the nut.

The principal object of this invention is to provide a releasable cam locking device capable of securely but releasably locking one member to another.

Another object of the invention is to provide such a cam locking device in which a housing can be releasably attached to a conduit or bracket having an internally threaded fitting at the conduit end.

Still another object of the invention is to provide such a cam locking device in which the camming element of the lock is adjustable to vary its effectiveness.

Another object of the invention is to provide such a cam locking device in which a threaded nipple is provided with a sleeve threaded thereto and supporting a pivotal cam for effecting a cam locking action.

A traffic signal may include a housing for supporting the signal lights. Such housings are adapted to be mounted on a bracket which usually is in the form of a conduit containing the wiring supplying current to the signals within the housing. Generally, a pipe fitting such as an L or sleeve is threaded to the end of the conduit where the traffic signal housing is to be mounted for angular adjustment.

In one aspect of the invention, a nipple may be threaded to the fitting at the end of the conduit and it may extend through an opening within a wall of the housing to the interior thereof.

In another aspect of the invention, cam locking means may be pivotally connected to trunnions on the nipple within the housing.

In still another aspect of the invention, the pivotally mounted cam may comprise spaced parallel arms joined by a bridging portion, and the arms are of such length that the bridging portion is located radially beyond the nipple when the cam is in locked position.

In still another aspect of the invention, the bridging portion may include an opening for receiving a screwdriver blade or the like for prying open the cam locking device.

The above, other objects and novel features of the invention will become apparent from the following specification and accompanying drawing which is merely exemplary.

Figure 3:
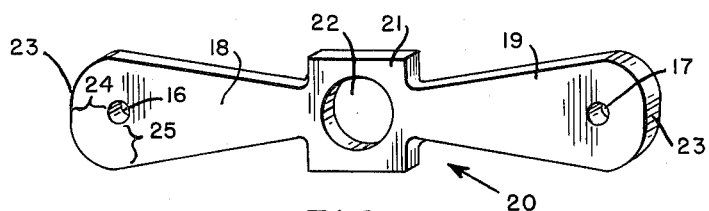
FIG. 3 is a perspective enlarged view of the cam lock shown in FIG. 1.
Figure 2:
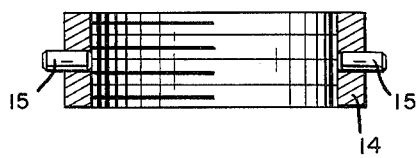
FIG. 2 is a view of an element shown in FIG. 1.
Figure 1:
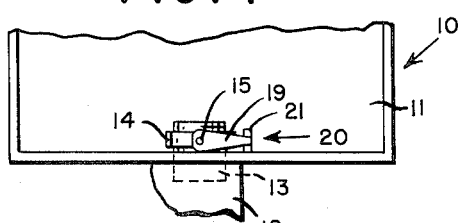
FIG. 1 is a sectional elevational view of a traffic signal housing locked to a conduit by a locking device embodying the principles of the invention.

Referring to the drawings, and particularly to FIGS. 1, 2 and 3, the principles of the invention are shown as applied to a traffic signal housing 10 including an openable closure 11. The housing 10 is shown mounted on a fitting 12 which is the terminus of a conduit through which the electrical conductors pass which are connected to traffic signals within the housing 10. The housing 10 is connected to the L fitting 12 by a threaded nipple 13 that is threaded thereinto and extends through a hole in the base of the housing 10. An internally threaded sleeve 14 may be threaded onto the nipple 13 within housing 10.

Referring to FIGS. 2 and 3, the internally threaded sleeve 14 may include diametrically located trunnions 15 adapted to receive journals 16 and 17 in arms 18 and 19 of a cam member 20. FIG. 3 shows the cam member 20 prior to the arms 18 and 19 thereof being bent at right angles to a central portion 21 such that said arms extend in parallel relation to each other in the same direction from portion 21. A hole 22 is provided in the portion 21 for a purpose to be described later. Referring to FIG. 3, the ends of arms 18 and 19 are provided with cam surfaces 23 in which the distance 24 is less than the distance 25.

In assembling the clamp device of FIGS. 1, 2 and 3, the sleeve 14 is screwed onto nipple 13 with the arms 18 and 19 extending substantially vertically to a point such that when the portion 21 is forced down into engagement with the base of housing 10, the distance 25 of arms 18 and 19 is slightly greater than the distance from the axis of trunnions 15 to the base of housing 10. Furthermore, the height of portion 21 is such that when it is forced into contact with the base of housing 10, the point of contact between cam 23 and housing 10 is such that the longitudinal centerline of arms 18 and 19 is inclined downwardly from the axis of trunnions 15, thereby providing a self-locking cam arrangement. The cam member 20 may be forced into its locked position by any convenient tool such as a hammer. To release the cam member 20, the blade of a screwdriver or similar tool may be inserted within the hole 22 of portion 21 in such a fashion as to rest on the top of sleeve 14. Then, by prying upwardly, the cam lock 20 will move counterclockwise (FIG. 1), thereby releasing the device.

Referring to FIGS. 4, 5, 6 and 7, the principles of the invention are shown as applied to a traffic signal housing 26 including an opening 27 and traffic signal lens means 28. The housing 26 is shown mounted on an L 29 forming the terminus of a conduit 30 through which electrical conductors pass which latter supply power to the signal mechanism (not shown) within housing 26.

Figure 5:
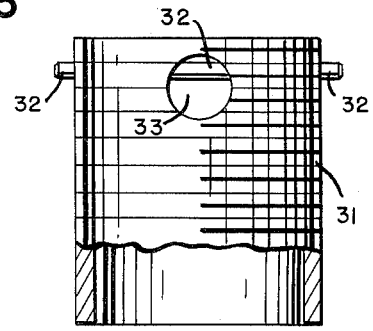
FIG. 5 is an elevational view of an element of the structure of FIG. 4.
Figure 4:
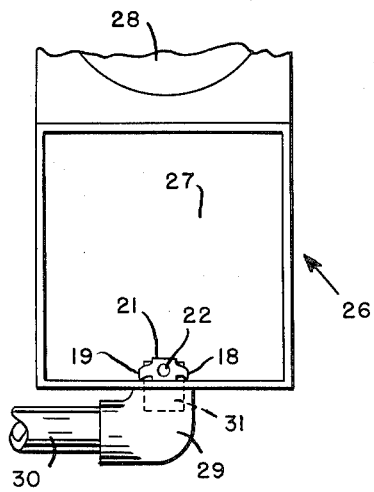
FIG. 4 is a view of a traffic signal housing connected to a fitting at the end of a conduit by a means embodying a modified form of the invention.

In the embodiment disclosed in FIGS. 4 to 7, an externally threaded sleeve 31 is shown threaded into L 29 and extending through a hole within the base of housing 26. Referring to FIG. 5, the sleeve 31 is provided with diametrically disposed trunnions 32, produced by a rod extending through diametrically aligned apertures within the wall of sleeve 31. Diametrically disposed holes 33 are provided in the wall of sleeve 31 and they are aligned on an axis at right angles to the axis of trunnions 32. The cam member 20 may be mounted on trunnions 32 in the same way it was mounted on trunnions 15.

Figure 6:
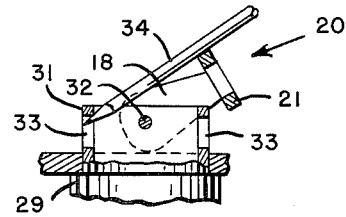
FIGS. 6 and 7 are views of the manner of operating the cam lock of FIG. 4.
Figure 7:
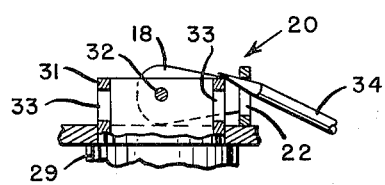

In assembling the locking device of FIGS. 4 to 7, the sleeve 31, with the member 20 mounted thereon with arms 18 and 19 substantially vertical, is inserted from the inside of housing 26 through the hole in the base thereof and is threaded into the L 29 to a point where the cam surfaces 23 on arms 18 and 19 engage the base of housing 26 and lock the latter to the L 29. Referring to FIG. 6, by inserting the blade 34 of a screwdriver or other similar tool into one of the holes 33 of sleeve 31 and prying down on the top of portion 21, the member 20 will be moved into locking position. To release the member 20, the blade 34 may be inserted through the hole 22 of portion 20 and purchased on the top of sleeve 31. Then, by prying upwardly, the cam member 20 is moved counterclockwise, releasing the locking member 20.

Although the various features of the improved locking device have been shown and described in detail to fully disclose two embodiments of the invention, it will be evident that changes may be made in such details and certain features may be used without others without departing from the principles of the invention.

What is claimed is:

1. In an apparatus including a housing having a relatively inaccessible interior adapted to be connected to the terminus of a conduit comprising in combination, a fitting connected to said conduit forming its terminus, an external shoulder formed on said fitting, said fitting extending through a hole in a wall of said housing, means on said fitting for releasably locking said housing to said fitting, said means including trunnion means diametrically disposed on said fitting, arm means pivoted at its one end to said trunnion means and being of a length greater than the radius of said fitting and a bight portion connecting said arm means, cam means at the ends of said arm means swingable about said trunnion means and adapted to engage the wall of said housing adjacent the hole therein when said arm means is in one of its pivotal positions, said fitting having at least one hole in the wall and adjacent the free end thereof, and walls defining a hole in said bight portion, a tangent to the periphery of the hole in the bight portion which is parallel to said trunnion means being above said free end of said fitting, the axes of the holes in said fitting and arm means being so constructed and arranged relative to the pivotal connection for said arm means that a line extending axially through said pivots projects normal to a tangent to the periphery of the hole in the fitting drawn on a radius parallel to the axis of said fitting and between the center line and a corresponding point on the periphery of the hole in said arm means whereby a prying tool is adapted to be inserted through at least one of said holes and engageable with at least one of said fitting and arm means for imparting pivotal movement of said arm means to locked and unlocked positions.

2. In an apparatus according to claim 1, wherein said fitting is threaded.

3. In an apparatus according to claim 2, wherein said locking means comprises a generally U-shaped element having the ends of its legs pivotally connected to said sleeve along a diameter thereof and the length of its legs being greater than the radius of said fitting.

References Cited by the Examiner
UNITED STATES PATENTS

| 556,755 | 3/96 | Kelly | 285—394 X |
| 648,361 | 4/00 | Sheahan. | |
| 2,398,962 | 4/46 | Randrup. | |

FOREIGN PATENTS 21,838   10/96   Great Britain.

CARL W. TOMLIN, *Primary Examiner.*

THOMAS F. CALLAGHAN, *Examiner.*